Jan. 17, 1939.   G. H. HUNT   2,144,020
BRAKE
Filed Sept. 18, 1935
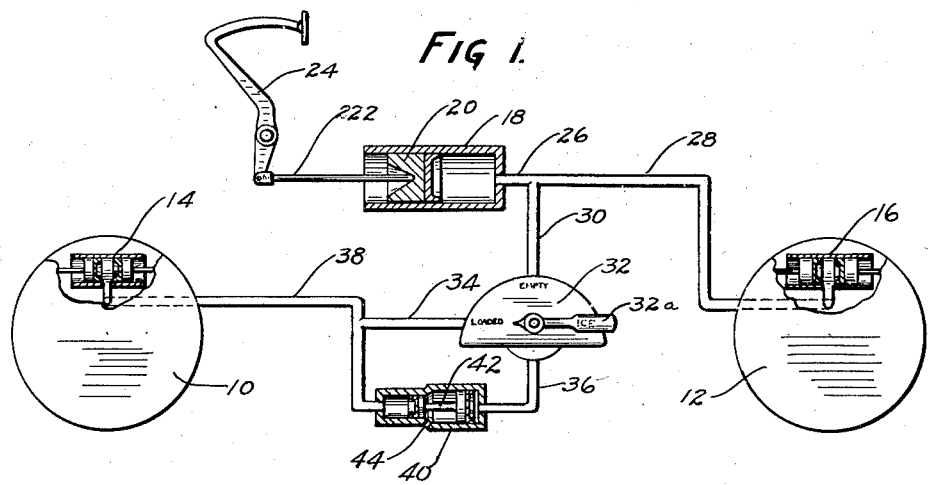
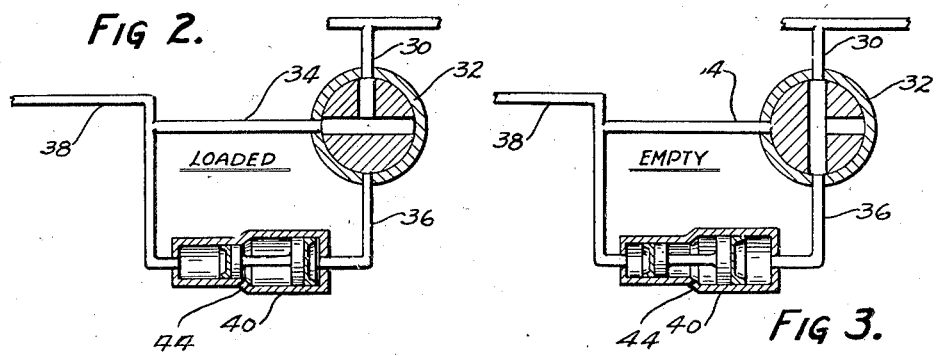
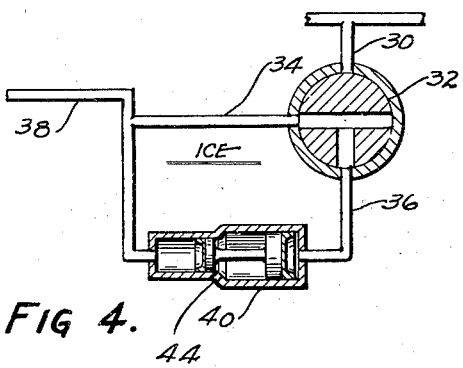
INVENTOR.
GEORGE H. HUNT
BY Jerome R. Cox
ATTORNEY.

Patented Jan. 17, 1939

2,144,020

UNITED STATES PATENT OFFICE 2,144,020

BRAKE

George H. Hunt, South Bend, Ind., assignor to Bendix Products Corporation, South Bend, Ind., a corporation of Indiana Application September 18, 1935, Serial No. 41,120

7 Claims. (Cl. 188—152)

This invention relates to a system for braking automotive vehicles and is illustrated by a hydraulic braking system.

One of the objects of my invention is to provide a hydraulic braking system in which the force of the brakes being applied to the front wheels of the automobile or to the rear wheels of the automobile may be varied relative to the amount of braking being applied to the other set of brakes.

A further object of the invention is the provision of means for at times boosting the pressure in a hydraulic brake system which is being used in applying one or the other of the sets of brakes.

A feature of the invention is the provision and construction of a booster cylinder or hydraulic ram which may be inserted in the connections leading to one of the sets of brakes.

A further feature of the invention is the provision in combination with such a booster cylinder of means for by-passing liquid past said cylinder.

A further feature is the provision in combination with two separate sets of brakes of means for cutting off the hydraulic connections leading to one of the sets of brakes.

Further features and objects of the invention will be apparent after a reading of the subjoined specification and claims and after a consideration of the accompanying drawing, in which:

Figure 1 is a diagrammatic view of a hydraulic brake system illustrating my invention;

Figure 2 is a diagrammatic view on a slightly larger scale of a fragment of the device shown in Figure 1 showing the control valve so arranged as to by-pass the booster cylinder;

Figure 3 is a view similar to Figure 2 showing the valve so arranged as to utilize the booster cylinder; and Figure 4 is a view similar to Figures 2 and 3 showing the valve so arranged as to cut off entirely the hydraulic conections to the front brakes.

Referring in detail to the drawing, it may be seen that I have illustrated an automobile provided with front brakes 10 and rear brakes 12 arranged to be actuated by wheel cylinders 14 and 16 respectively, the wheel cylinder 16 having a larger diameter, and its pistons having a larger effective area than those of the wheel cylinder 14. A master cylinder 18 is provided with a master cylinder piston 20 which is connected by a piston rod 22 with a pedal 24 so that the piston may be actuated by the pedal. A main hydraulic conduit 26 connected to the master cylinder is also connected to branch conduits 28 and 30. The conduit 28 leads directly to the wheel cylinder 16 of the rear brakes 12 and the conduit 30 leads to a valve 32. The valve is connected optionally with conduits 34 and 36, the former connecting directly with a conduit 38 leading to the wheel cylinder 14 and the conduit 36 being connected to a booster cylinder 40 which in turn is connected with the conduit 38. The booster cylinder 40 has a rear bore of relatively large diameter and a forward bore of relatively small diameter and is provided with a plunger 42 having a rear piston fitting in the large diameter and having a forward piston fitting in the small diameter bore. The space between the pistons of the plunger 42 is vented through the atmosphere through a port 44. Pressure introduced into the rear of the cylinder 40 acts on the rear piston of the plunger 42 and the pressure is thus transmitted to the forward piston which acts upon the liquid in the front of the booster cylinder 40. In view of the differences of the areas of the two pistons the pressure transmitted to the liquid ahead of the booster cylinder is considerably greater than that received at the rear of the booster cylinder.

In Figure 2 the valve 32 is shown in a position in which it connects the conduit 30 with the conduit 34 and thus by-passes the booster cylinder 40. In Figure 3 the valve 32 is shown in the position in which it connects the conduit 30 with the conduit 36 and thus utilizes the booster cylinder 40. In Figure 4 the valve 32 is shown in the position in which it cuts off from the conduit 30 both the conduit 34 and the conduit 36 and thus eliminates the front brakes entirely from the hydraulic braking system.

It is believed that the operation of the device illustrated will be apparent from the above. In driving with the vehicle loaded the valve 32 is positioned as shown in Figures 1 and 2 and on account of the larger diameter of the wheel cylinder 16 a proportionately large force is transmitted to the rear brakes for applying those brakes. Actuation of the pedal 24 forces liquid from the master cylinder 18 through the various conduits directly to the wheel cylinders 14 and 16 and thus spreads the shoes to apply the brakes. When the vehicle is empty the operator operates the valve 32 by the hand lever 32ª to move the pointer of the handle to indicate the word "empty", thus moving the valve to the position shown in Figure 3 and including the booster cylinder 40 in the connection to the front brakes. By reason of the booster cylinder 40 greater pressure is transmitted to the wheel cylinder 14 than is transmitted to the wheel cylinder 16 and by the proportioning of the size of the cylinders, I arrange that the greater part of the braking shall be accomplished by the front wheel brakes. When the streets are extremely slippery, as may happen for instance under certain conditions of ice, it is positively dangerous to apply brakes. Then the operator rotates the handle 32ª, 180° from the position of Figure 1 so that the pointer points to the legend "Ice". Thereupon the front brakes are entirely eliminated.

It is to be understood that the above-described embodiment of my invention is for the purpose of illustration only and various changes may be made therein without departing from the spirit and scope of the invention.

I claim:

1. In a hydraulic braking system, front wheel brakes, rear wheel brakes, wheel cylinders for applying said front wheel brakes, wheel cylinders for applying said rear wheel brakes, means for supplying liquid under uniform pressure to said wheel cylinders for operating them to apply the brakes, means for varying the pressure in the fluid supplied to one of said sets of brakes without varying the pressure supplied to the other of said sets of brakes and a valve for optionally including or eliminating said varying means.

2. In a hydraulic braking system, front wheel brakes, rear wheel brakes, wheel cylinders for applying said front wheel brakes, wheel cylinders for applying said rear wheel brakes, a master cylinder for supplying liquid under pressure to said wheel cylinders in a predetermined proportion for operating them to apply the brakes, fluid lines connecting said cylinders, means comprising a booster cylinder inserted in one of said fluid lines for varying the pressure supplied to one of said sets of brakes so that it differs from the pressure supplied to the other of said sets of brakes, and means operable to eliminate said booster cylinder from said one line.

3. In a hydraulic braking system front wheel brakes, rear wheel brakes, wheel cylinders for applying said front wheel brakes, wheel cylinders having a different diameter for applying said rear wheel brakes, means for supplying liquid under uniform pressure to said wheel cylinders for operating them to apply the brakes, means for varying the pressure in the fluid supplied to one of said sets of brakes from that supplied to the other of said sets of brakes, and means for optionally including or eliminating said varying means.

4. In a hydraulic braking system front wheel brakes, rear wheel brakes, a set of wheel cylinders for applying said front wheel brakes, a set of wheel cylinders for applying said rear wheel brakes, means for supplying liquid under uniform pressure to said wheel cylinders for operating them to apply the brakes, including connections to the sets of wheel cylinders, a booster cylinder arranged to be interposed in the connection to one of said sets of wheel cylinders, and a valve for optionally including said booster cylinder in the connection to said set of brakes or for by-passing said cylinder.

5. In a hydraulic braking system front wheel brakes, rear wheel brakes, a set of wheel cylinders for applying said front wheel brakes, a set of wheel cylinders for applying said rear wheel brakes, means for supplying liquid under uniform pressure to said wheel cylinders for operating them to apply the brakes, including connections to said sets of wheel cylinders, a booster cylinder arranged to be interposed in the connection to one of said sets of wheel cylinders, and a valve for optionally including said booster cylinder in the connection to the brakes, for by-passing said cylinder, or for entirely eliminating one of said sets of brakes.

6. In a hydraulic braking system, front wheel brakes, rear wheel brakes, wheel cylinders for applying said front wheel brakes, wheel cylinders for applying said rear wheel brakes, a master cylinder for supplying liquid under uniform pressure to said wheel cylinders for operating them to apply the brakes, fluid lines connecting said cylinders, and means for selectively establishing either of two fixed ratios of the pressure supplied to one of said sets of brakes as compared to that supplied to the other of said sets of brakes.

7. In a hydraulic braking system, front wheel brakes, rear wheel brakes, wheel cylinders for applying said front wheel brakes, wheel cylinders for applying said rear wheel brakes, a master cylinder for supplying liquid under uniform pressure to said wheel cylinders for operating them to apply the brakes, a foot pedal for operating said master cylinder, fluid connections separately connecting said master cylinder with said front wheel brake cylinders and with said rear wheel brake cylinders, a device inserted in one of said lines for varying the proportion of pressure in the two wheel cylinders, while maintaining each in a definite predetermined proportion to the pressure developed in the master cylinder, and means for making said device effective or ineffective at the option of the operator.

GEORGE H. HUNT.